(12) United States Patent
Leu

(10) Patent No.: US 11,366,286 B2
(45) Date of Patent: Jun. 21, 2022

(54) OCULAR OPTICAL SYSTEM

(71) Applicant: Jorjin Technologies Inc., New Taipei (TW)

(72) Inventor: Chun-Wei Leu, New Taipei (TW)

(73) Assignee: Jorjin Technologies Inc., New Taipei (TW)

( * ) Notice: Subject to any disclaimer, the term of this patent is extended or adjusted under 35 U.S.C. 154(b) by 261 days.

(21) Appl. No.: 16/782,034

(22) Filed: Feb. 4, 2020

(65) Prior Publication Data

US 2021/0173179 A1 Jun. 10, 2021

(30) Foreign Application Priority Data

Dec. 4, 2019 (TW) .................................. 108144233

(51) Int. Cl.
*G02B 9/12* (2006.01)
*G02B 27/01* (2006.01)

(52) U.S. Cl.
CPC ........... *G02B 9/12* (2013.01); *G02B 27/0101* (2013.01)

(58) Field of Classification Search
CPC .. G02B 27/0101; G02B 13/24; G02B 25/001; G02B 27/0172; G02B 9/60; G02B 9/62; G02B 9/12–32; G02B 913/0035; G02B 913/18; G02B 93/04
USPC ... 359/642, 643, 644, 645, 13–14, 629–633, 359/716
See application file for complete search history.

(56) References Cited

U.S. PATENT DOCUMENTS

| 2010/0246006 | A1* | 9/2010 | Suzuki | G02B 27/4216 359/570 |
| 2014/0218806 | A1* | 8/2014 | Ishizuka | G02B 27/027 359/644 |
| 2014/0340558 | A1 | 11/2014 | Nakahara | |
| 2015/0205091 | A1* | 7/2015 | Matsuo | G02B 25/001 359/645 |
| 2015/0362720 | A1* | 12/2015 | Saito | G02B 25/001 359/644 |
| 2017/0123204 | A1* | 5/2017 | Sung | G02B 27/0103 |

(Continued)

FOREIGN PATENT DOCUMENTS

CN 106773009 5/2017

OTHER PUBLICATIONS

"Office Action of Taiwan Counterpart Application", dated May 21, 2020, p. 1-p. 4.

*Primary Examiner* — Marin Pichler
*Assistant Examiner* — Alberto J Betancourt
(74) *Attorney, Agent, or Firm* — JCIPRNET

(57) ABSTRACT

An ocular optical system configured to allow imaging rays from a display image to enter an observer's eye through the ocular optical system so as to form an image is provided. A direction toward the eye is an eye side, and a direction toward the display image is a display side. The ocular optical system includes a first lens element, a second lens element, and a third lens element arranged along an optical axis in sequence from the eye side to the display side. Each of the first to third lens elements has an eye-side surface and a display-side surface. The ocular optical system satisfies: 0<f/f1+f/f2+f/f3<0.35, where f is an effective focal length of the ocular optical system, f1 is a focal length of the first lens element, f2 is a focal length of the second lens element, and f3 is a focal length of the third lens element.

9 Claims, 9 Drawing Sheets

(56) References Cited

U.S. PATENT DOCUMENTS

2017/0248769 A1\* 8/2017 Stamenov ............ G02B 25/001
2018/0143401 A1\* 5/2018 Bone .................. G02B 27/0172

\* cited by examiner

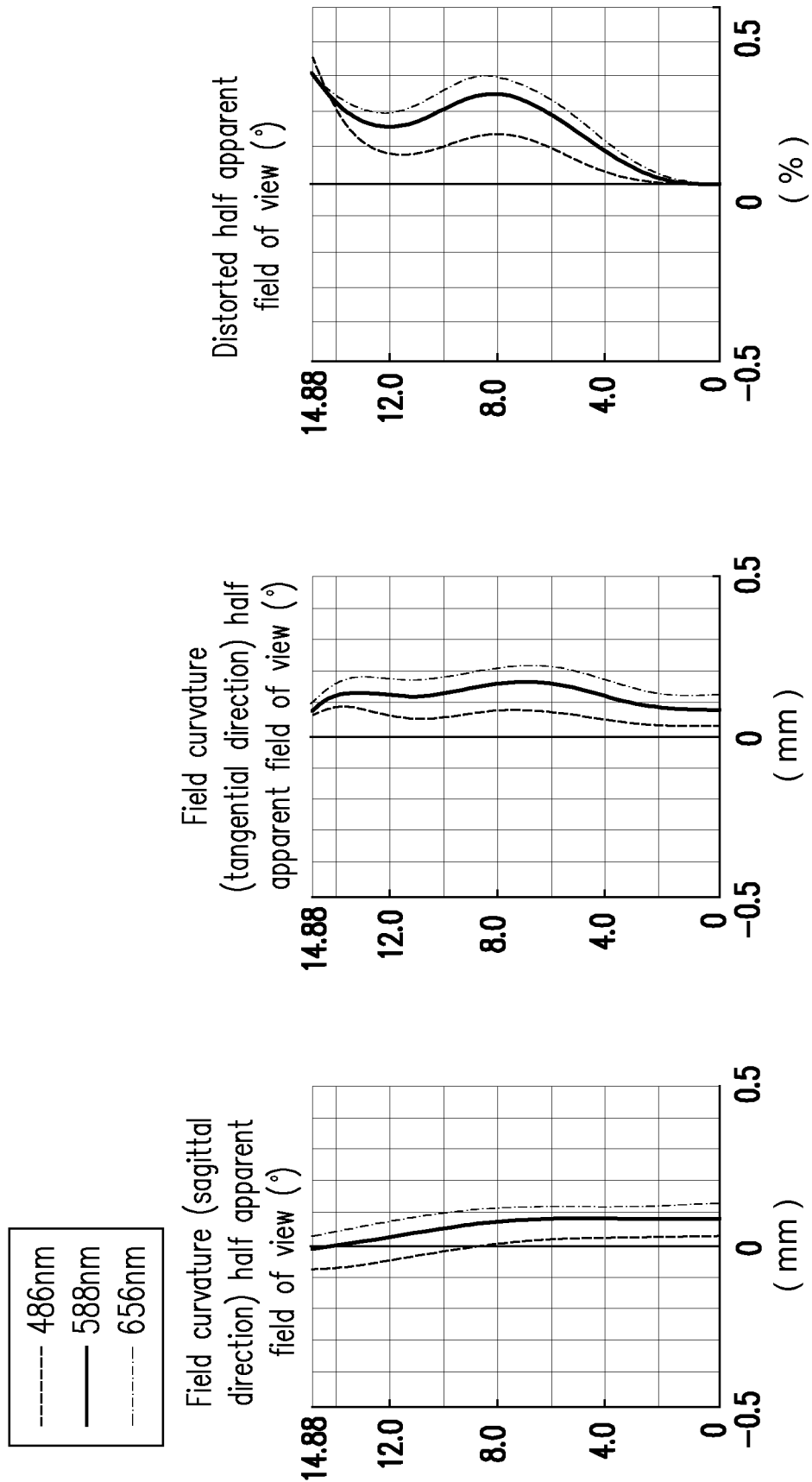

(12)  US 11,366,286 B2

OCULAR OPTICAL SYSTEM

CROSS-REFERENCE TO RELATED APPLICATION

This application claims the priority benefit of Taiwan application serial no. 108144233, filed on Dec. 4, 2019. The entirety of the above-mentioned patent application is hereby incorporated by reference herein and made a part of this specification.

BACKGROUND OF THE INVENTION

1. Field of the Invention

The invention relates to an optical system, and in particular, to an ocular optical system.

2. Description of Related Art

On the market, the eye relief of an ocular optical system generally falls within 12 to 15 mm. However, when the eye relief is to be applied to a near-eye display such as a virtual reality (VR) display, an augmented reality (AR) display, or a see-through (see-through) near-eye display, such a short eye relief is difficult to be applied to an augmented reality application scenario or a near-eye display application scenario. In addition, the short eye relief usually leads to the problem of poor telecentricity. As such, imaging quality of the ocular optical system is affected.

SUMMARY OF THE INVENTION

The invention provides an ocular optical system having long eye relief and favorable telecentricity.

An embodiment of the invention provides an ocular optical system, configured to allow an imaging ray to enter an eye of an observer from a display image through the ocular optical system to form an image. A direction toward the eye is an eye side, and a direction toward the display image is a display side. The ocular optical system sequentially includes a first lens, a second lens, and a third lens along an optical axis from the eye side to the display side. The first lens to the third lens each includes an eye-side surface facing the eye side and allowing the imaging ray to pass and a display-side surface facing the display side and allowing the imaging ray to pass. The first lens has positive refractive power. The second lens has positive refractive power. The third lens has negative refractive power. The ocular optical system satisfies: $0<f/f1+f/f2+f/f3<0.35$, where f is a system focal length of the ocular optical system, f1 is a focal length of the first lens, f2 is a focal length of the second lens, and f3 is a focal length of the third lens.

In an embodiment of the invention, the foregoing ocular optical system further satisfies: $|f/f3|>1.6$.

In an embodiment of the invention, the foregoing ocular optical system further satisfies: $0.25<CT3/CT2<0.8$, CT2 is a thickness of the second lens on the optical axis, and CT3 is a thickness of the third lens on the optical axis.

In an embodiment of the invention, the foregoing ocular optical system further satisfies: $V3/(V2-V3)<0.8$, V2 is an Abbe number of the second lens, and V3 is an Abbe number of the third lens.

In an embodiment of the invention, the foregoing ocular optical system further satisfies: $|R3-R6|/|R3+R6|<0.12$, R3 is a curvature radius of the eye-side surface of the second lens, and R6 is a curvature radius of the display-side surface of the third lens.

In an embodiment of the invention, the foregoing ocular optical system further satisfies: $D/TTL>0.85$, D is a distance from a pupil of the observer to the eye-side surface of the first lens on the optical axis, and TTL is a distance from the eye-side surface of the first lens to the display image on the optical axis.

In an embodiment of the invention, the foregoing ocular optical system further satisfies: $f/EPD<3.35$, and EPD is an exit pupil diameter of the ocular optical system.

In an embodiment of the invention, the foregoing ocular optical system further satisfies: $D>30$ mm, and D is a distance from a pupil of the observer to the eye-side surface of the first lens on the optical axis.

In an embodiment of the invention, only the first lens, the second lens, and the third lens in the foregoing ocular optical system have refractive power.

In an embodiment of the invention, the foregoing ocular optical system further includes a beam splitter. The beam splitter is disposed between the eye of the observer and the first lens on the optical axis. The optical axis includes a first optical axis and a second optical axis not overlapping the first optical axis. The first optical axis and the second optical axis intersect at an intersection point on a beam splitting surface of the beam splitter, and a lens having refractive power in the ocular optical system is disposed only on the second optical axis.

Based on the above, because the first lens of the ocular optical system in the embodiments of the invention has positive refractive power, the second lens has positive refractive power, the third lens has negative refractive power, and the ocular optical system satisfies a condition: $0<f/f1+f/f2+f/f3<0.35$, the ocular optical system in the embodiments of the invention exhibits features of long eye relief and favorable telecentricity and delivers favorable optical imaging quality.

To make the foregoing features and advantages of the invention clearer and more comprehensible, the following provides detailed descriptions by using the embodiments and with reference to the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3A to FIG. 3D are diagrams of field curvature aberrations and various aberrations of the ocular optical system according to the first embodiment.

DESCRIPTION OF THE EMBODIMENTS

Figure 1:
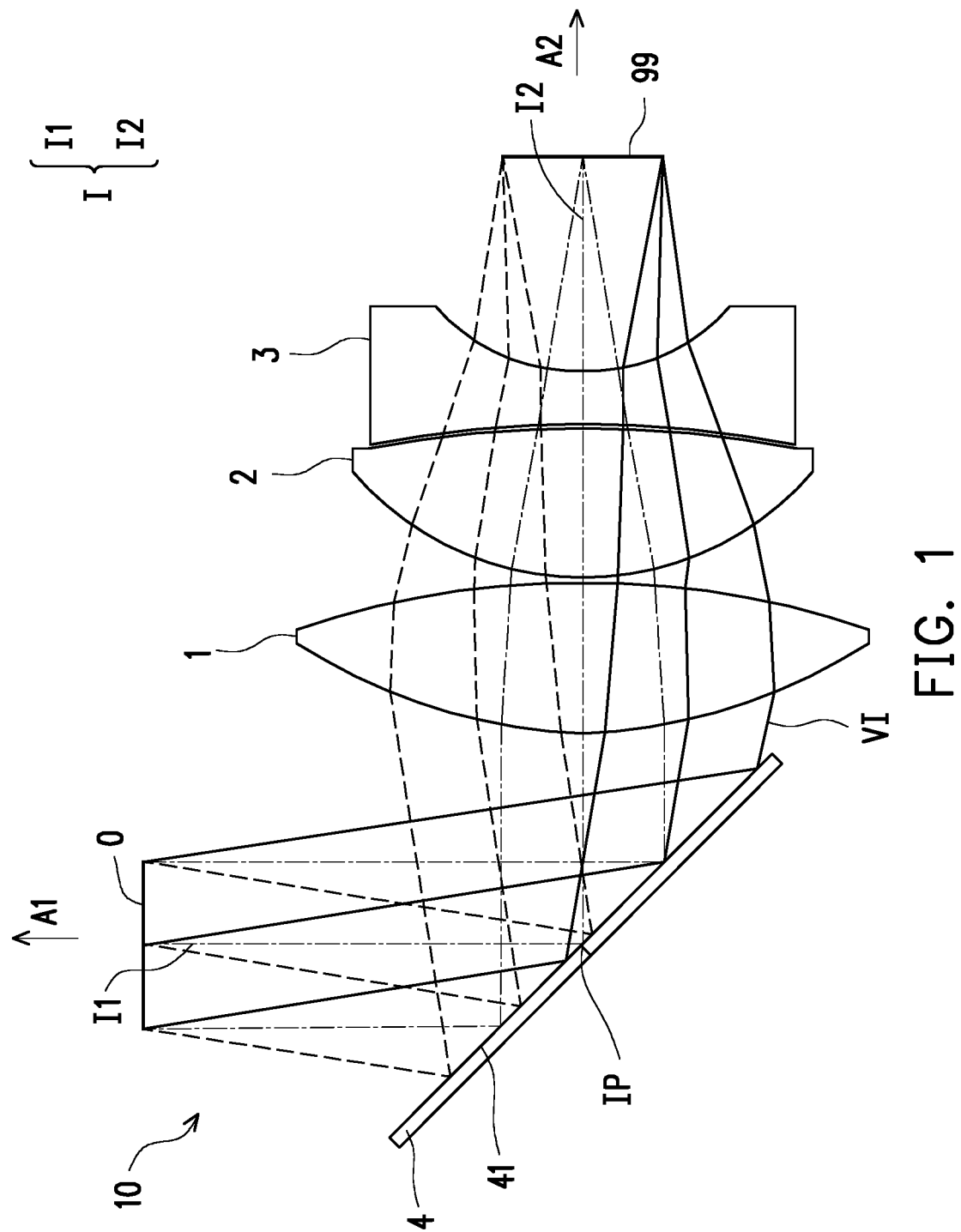
FIG. 1 schematic diagram of an ocular optical system including a beam splitter according to a first embodiment of the invention.

In general, a light direction of an ocular optical system 10 is an imaging ray VI emitted from a display image 99, enters a pupil 0 of an eye through the ocular optical system 10, focuses on a retina of the eye to form an image, and produces an enlarged virtual image at a virtual image distance, as shown in FIG. 1. A criterion for determining optical specifications of the invention and imaging quality curves (for example, FIG. 3A to FIG. 3E and FIG. 5A to FIG. 5E) thereof below is assuming that the light direction reversely tracks as a parallel imaging ray passing from an eye side A1 to the display image 99 through the ocular optical system 10 to focus for imaging, to form the imaging quality curves of FIG. 3A to FIG. 3E and FIG. 5A to FIG. 5E.

FIG. 1 is a schematic diagram of an ocular optical system including a beam splitter according to a first embodiment of the invention. Referring to FIG. 1, the ocular optical system 10 sequentially includes a beam splitter 4, a first lens 1, a second lens 2, and a third lens 3 along an optical axis I of the ocular optical system 10 from the eye side A1 to a display side A2. In the present embodiment, the optical axis I includes a first optical axis I1 and a second optical axis I2 not overlapping the first optical axis I1. In the present embodiment, the optical axis I is bent by a beam splitting surface 41 of the beam splitter 4. A first optical axis I1 is a part of the optical axis I before being bent by the beam splitter 4, and a second optical axis I2 is another part of the optical axis I after being bent by the beam splitter 4. A light beam transmitting along the first optical axis I1 has at least one part reflected by the beam splitting surface 41, and is then transmitted along the second optical axis I2. In other words, the first optical axis I1 and the second optical axis I2 intersect at an intersection point IP on the beam splitting surface 41 of the beam splitter 4. In the present embodiment, a lens having refractive power of the ocular optical system 10 is disposed only on the second optical axis I2.

In the present embodiment, reflectivity and penetration of the beam splitter 4 are, for example, 50% of reflection and 50% of penetration, but the invention is not limited thereto.

Because the beam splitter 4 is merely bending the imaging ray VI emitted by the display image 99 on an optical path for an observer, for ease of description, the beam splitter is omitted in the following embodiments of the invention. On the other hand, if the beam splitter 4 is directly viewed from the pupil 0 of the eye along the first optical axis I1, the beam splitter 4 may be seen through and a scene behind the beam splitter 4 may be seen. In other words, at least one part of light emitted by the scene behind the beam splitter 4 (that is, below the beam splitter 4 in FIG. 1) penetrates the beam splitter 4 and is transmitted to the pupil 0 of the eye, so that the ocular optical system 10 achieves an augmented reality effect.

Figure 2:
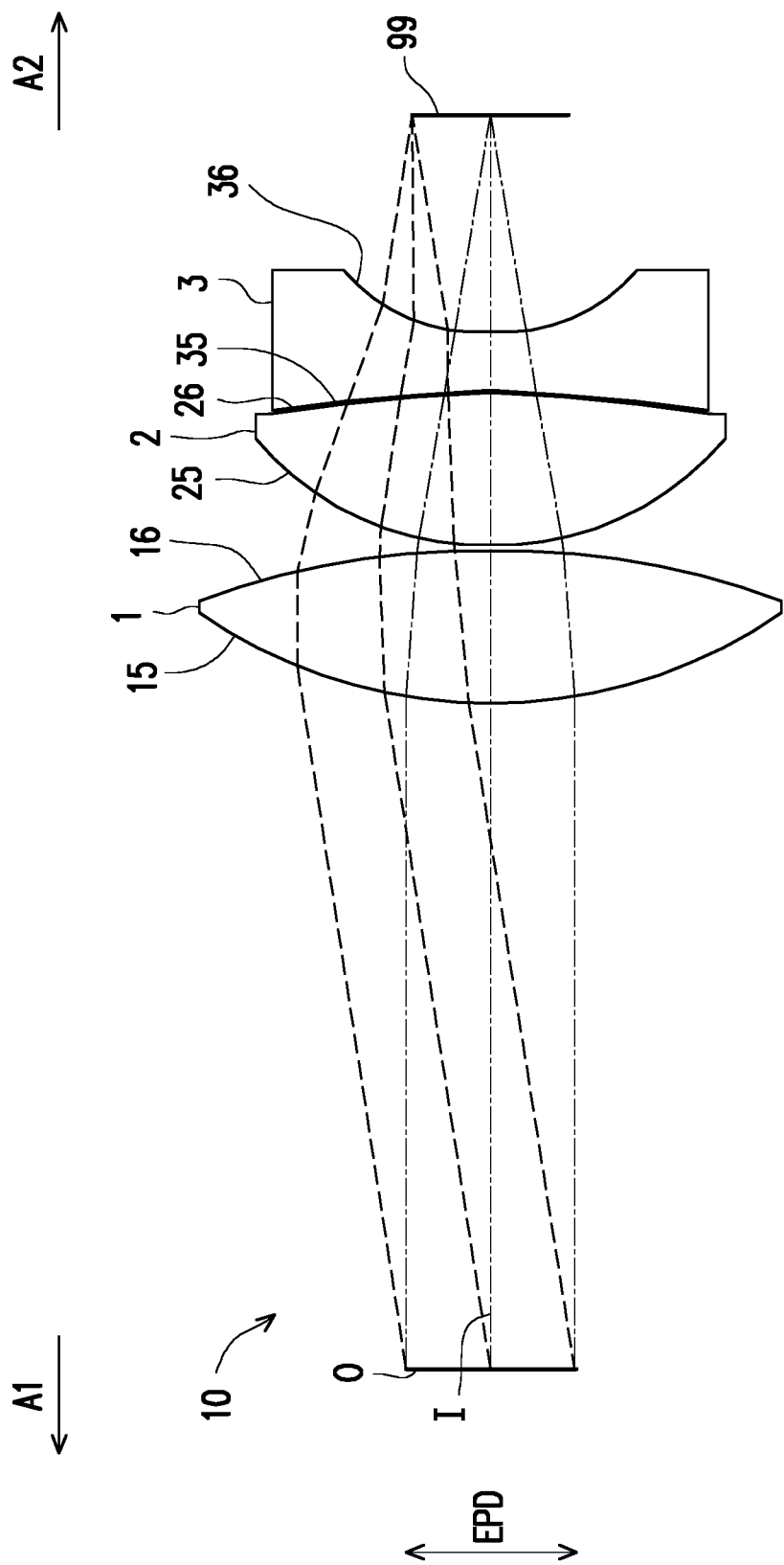
FIG. 2 is a schematic diagram of the ocular optical system according to the first embodiment of the invention.

FIG. 2 is a schematic diagram of the ocular optical system according to the first embodiment of the invention. FIG. 3A to FIG. 3D are diagrams of field curvature aberrations and various aberration of the ocular optical system according to the first embodiment. FIG. 3E is a modulation transfer function (MTF) diagram of the ocular optical system according to the first embodiment.

Referring to FIG. 2 first, the ocular optical system 10 according to the first embodiment of the invention is configured to allow the imaging ray of the display image 99 to enter the eye of the observer through the ocular optical system 10 and the pupil 0 of the eye of the observer to form an image. The display image 99 may be a vertical optical axis I, or may be an angle not equal to 90 degrees with the optical axis I. The eye side A1 is a side toward a direction of the eye of the observer, and the display side A2 is a side toward a direction of the display image 99. In the present embodiment, the ocular optical system 10 sequentially includes the first lens 1, the second lens 2, and the third lens 3 along the optical axis I from the eye side A1 to the display side A2. After being emitted, the imaging ray of the display image 99 sequentially passes through the third lens 3, the second lens 2, and the first lens 1, and then enters the eye of the observer through the pupil 0 of the observer. Subsequently, the imaging ray forms an image on the retina of the eye of the observer. Specifically, the first lens 1 to the third lens 3 of the ocular optical system 10 respectively include eye-side surfaces 15, 25, and 35 facing the eye side A1 and allowing the imaging ray to pass and display-side surfaces 16, 26, and 36 facing the display side A2 and allowing the imaging ray to pass.

In addition, to meet a requirement of a lightweight product, the first lens 1, the second lens 2, and the third lens 3 in the present embodiment each has refractive power and is made of a plastic material. Nevertheless, the material of each of the first lens 1, the second lens 2, and the third lens 3 is not limited thereto. In the present embodiment, only the first lens 1, the second lens 2, and the third lens 3 in the ocular optical system 10 has refractive power.

The first lens 1 in the present embodiment has positive refractive power. The eye-side surface 15 of the first lens 1 is a convex surface in a paraxial region (that is, a region near the optical axis I), and the display-side surface 16 of the first lens 1 is a convex surface in the paraxial region. The second lens 2 has positive refractive power. The eye-side surface 25 of the second lens 2 is a convex surface in the paraxial region, and the display-side surface 26 of the second lens 2 is a convex surface in the paraxial region. The third lens 3 has negative refractive power. The eye-side surface 35 of the third lens 3 is a concave surface in the paraxial region, and the display-side surface 36 of the third lens 3 is a concave surface in the paraxial region.

Other detailed optical data of the present embodiment is shown in the following Table 1. A system focal length (EFL) of the ocular optical system 10 is 23.893 mm, an apparent field of view (FOV) is 29.66°, an exit pupil diameter (EPD) is 8 mm, and an f-number (Fno) is 2.99. Specifically, "the f-number" in this specification is an f-number obtained through calculation by considering the pupil 0 of the observer as an entrance pupil according to the principle of reversibility of light. Moreover, the EPD corresponds to a diameter of the pupil 0 of the observer. In addition, a field number 15 in Table 1 indicates that it is the eye-side surface 15 of the first lens 1, and the reset can be deduced by analogy for other fields.

TABLE 1

The EFL = 23.893 mm, the FOV = 29.66°, the EPD = 8 mm, and the Fno = 2.99.

| Element | Surface | Curvature radius (mm) | Thickness (mm) | Refractivity | Abbe number | Focal length (mm) |
| --- | --- | --- | --- | --- | --- | --- |
| Object | | Infinite | Infinite | | | |
| Pupil 0 | | Infinite | 32.000 | | | |
| First lens 1 | 15 | 20.498 | 7.409 | 1.544 | 55.662 | 27.170 |
| | 16 | −46.320 | 0.284 | | | |
| Second lens 2 | 25 | 16.786 | 7.322 | 1.544 | 55.662 | 19.228 |
| | 26 | −23.520 | 0.100 | | | |

TABLE 1-continued

The EFL = 23.893 mm, the FOV = 29.66°, the EPD = 8 mm, and the Fno = 2.99.

| Element | Surface | Curvature radius (mm) | Thickness (mm) | Refractivity | Abbe number | Focal length (mm) |
|---|---|---|---|---|---|---|
| Third lens 3 | 35 | −23.520 | 2.764 | 1.642 | 22.409 | −13.062 |
|  | 36 | 13.638 | 10.474 |  |  |  |
|  | 99 | Infinite |  |  |  |  |

In the present embodiment, the eye-side surfaces 15, 25, and 35 are aspheric surfaces, the display-side surfaces 16, 26, and 36 are aspheric surfaces, and these aspheric surfaces are defined according to the following formula:

$$Z(Y) = \frac{Y^2}{R}\left(1 + \sqrt{1 - (1+K)\frac{Y^2}{R^2}}\right) + \sum_{i=1}^{n} a_{2i} \times Y^{2i}. \quad (1)$$

herein,

Y is a vertical distance between a point on the aspheric surface and the optical axis I, Z is a depth of the aspheric surface (a vertical distance between a point whose distance to the optical axis I is Y on the aspheric surface and a tangent plane tangent to an apex of the aspheric surface in the optical axis I), R is a curvature radius of a lens surface near the optical axis I, K is a conic constant, and $a_{2i}$ is a $2i^{th}$ aspheric surface coefficient.

Aspheric surface coefficients of the eye-side surfaces 15, 25, and 35 and the display-side surfaces 16, 26, and 36 in the formula (1) are shown in the following Table 2. A field number 15 in Table 2 indicates that this field is an aspheric surface coefficient of the eye-side surface 15 of the first lens 1, and the rest of the fields may be deduced by analogy. In the present embodiment, $a_2$ is 0.

TABLE 2

| Surface | K | $\alpha_4$ | $\alpha_6$ | $\alpha_8$ |
|---|---|---|---|---|
| 15 | 0 | −3.752297E−05 | 6.526096E−08 | −1.173444E−10 |
| 16 | −1.396141902 | −2.542512E−05 | 1.149337E−07 | −1.184459E−10 |
| 25 | 0 | 4.036734E−05 | −6.566261E−08 | 7.996979E−10 |
| 26 | −58.77026682 | 0 | 0 | 0 |
| 35 | −58.77026682 | 0 | 0 | 0 |
| 36 | 0 | 3.632598E−04 | −2.094324E−06 | 5.596508E−08 |

In addition, relationships between important parameters in the ocular optical system 10 of the present embodiment are shown in the following Table 3.

Herein, f is the system focal length of the ocular optical system 10, that is, the EFL of the ocular optical system 10, f1 is a focal length of the first lens 1, f2 is a focal length of the second lens 2, f3 is a focal length of the third lens 3, CT2 is a thickness of the second lens 2 on the optical axis I, CT3 is a thickness of the third lens 3 on the optical axis I, V2 is an Abbe number of the second lens 2, V3 is an Abbe number of the third lens 3, R3 is a curvature radius of the eye-side surface 25 of the second lens 2, R6 is a curvature radius of the display-side surface 36 of the third lens 3, and D is a distance from the pupil 0 of the observer to the eye-side surface 15 of the first lens 1 on the optical axis I, that is, an eye relief. In the ocular optical system 10 in FIG. 1, D is a sum of a distance from the pupil 0 of the observer to the intersection point IP of the beam splitter 4 on the first optical axis I1 and a distance from the intersection point IP of the beam splitter 4 to the eye-side surface of the first lens 1 on the second optical axis I2.

TTL is a distance from the eye-side surface 15 of the first lens 1 to the display image 99 on the optical axis I.

EPD is an exit pupil diameter of the ocular optical system 10, is a diameter corresponding to the pupil 0 of the observer, and is, for example, 3 mm during daytime and 7 mm at night.

TABLE 3

| Relational expression | Value |
|---|---|
| f/f1 + f/f2 + f/f3 | 0.29 |
| \|f/f3\| | 1.83 |
| CT3/CT2 | 0.38 |
| V3/(V2 − V3) | 0.67 |
| \|R3 − R6\|/\|R3 + R6\| | 0.10 |
| D/TTL | 1.13 |
| f/EPD | 2.99 |

Further referring to FIG. 3A to FIG. 3E, FIG. 3A to FIG. 3D are diagrams of field curvature aberrations and various aberrations of the ocular optical system according to the first embodiment. A diagram of aberration obtained after a light direction reversely tracks as a parallel imaging ray passing from the eye side A1 to the display image 99 sequentially through the pupil 0 and the ocular optical system 10 to focus for imaging is also provided. In the present embodiment, performance of each piece of aberration in each aberration diagram above determines performance of each piece of aberration of imaging of the imaging ray from the display image 99 on the retina of the eye of the observer. In other words, when each piece of aberration presented in each aberration diagram above is relatively small, each piece of aberration of the imaging on the retina of the eye of the observer is also relatively small, so that the observer can view an image with favorable imaging quality.

Figure 3D:
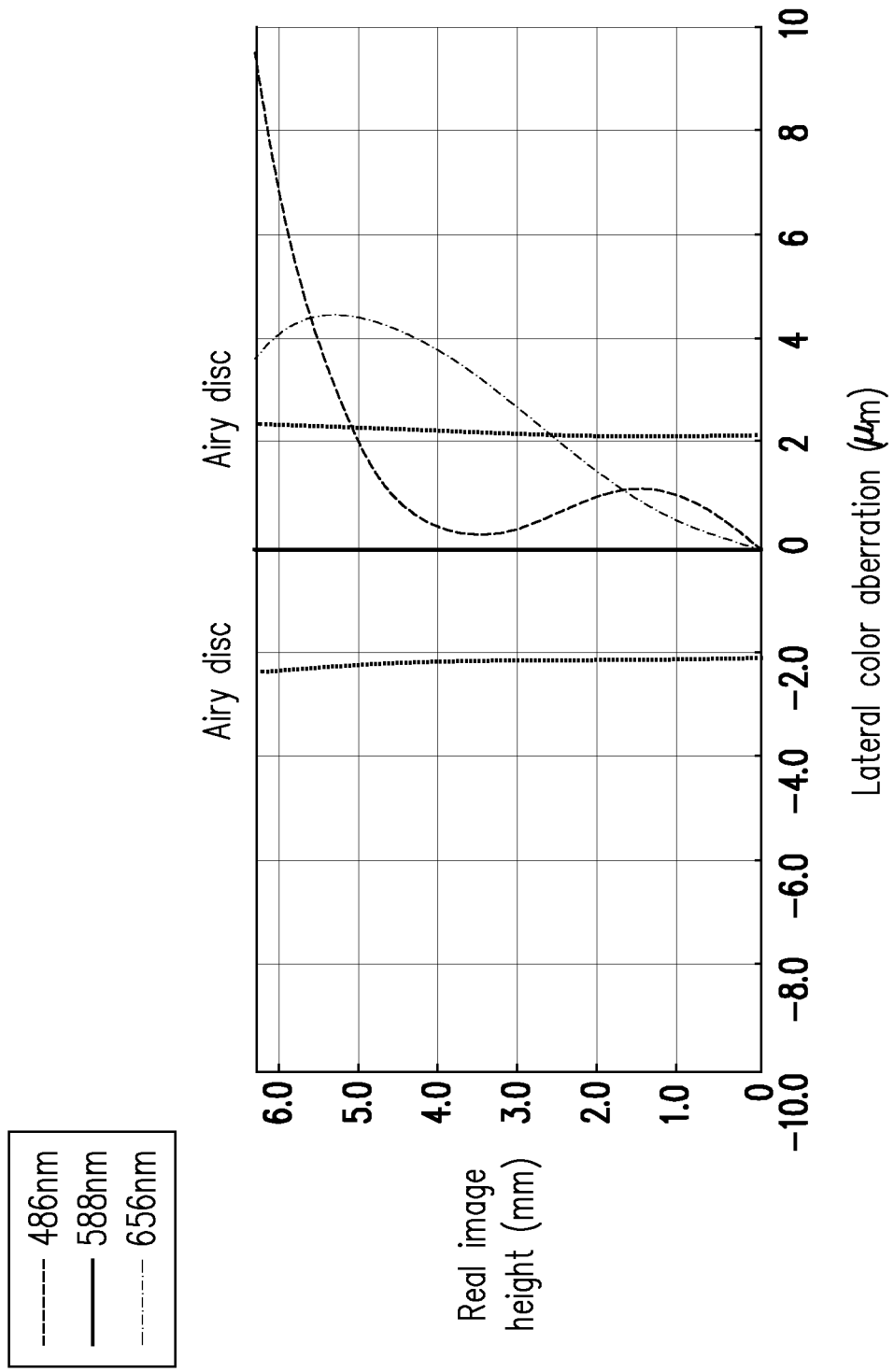
Figure 3E:
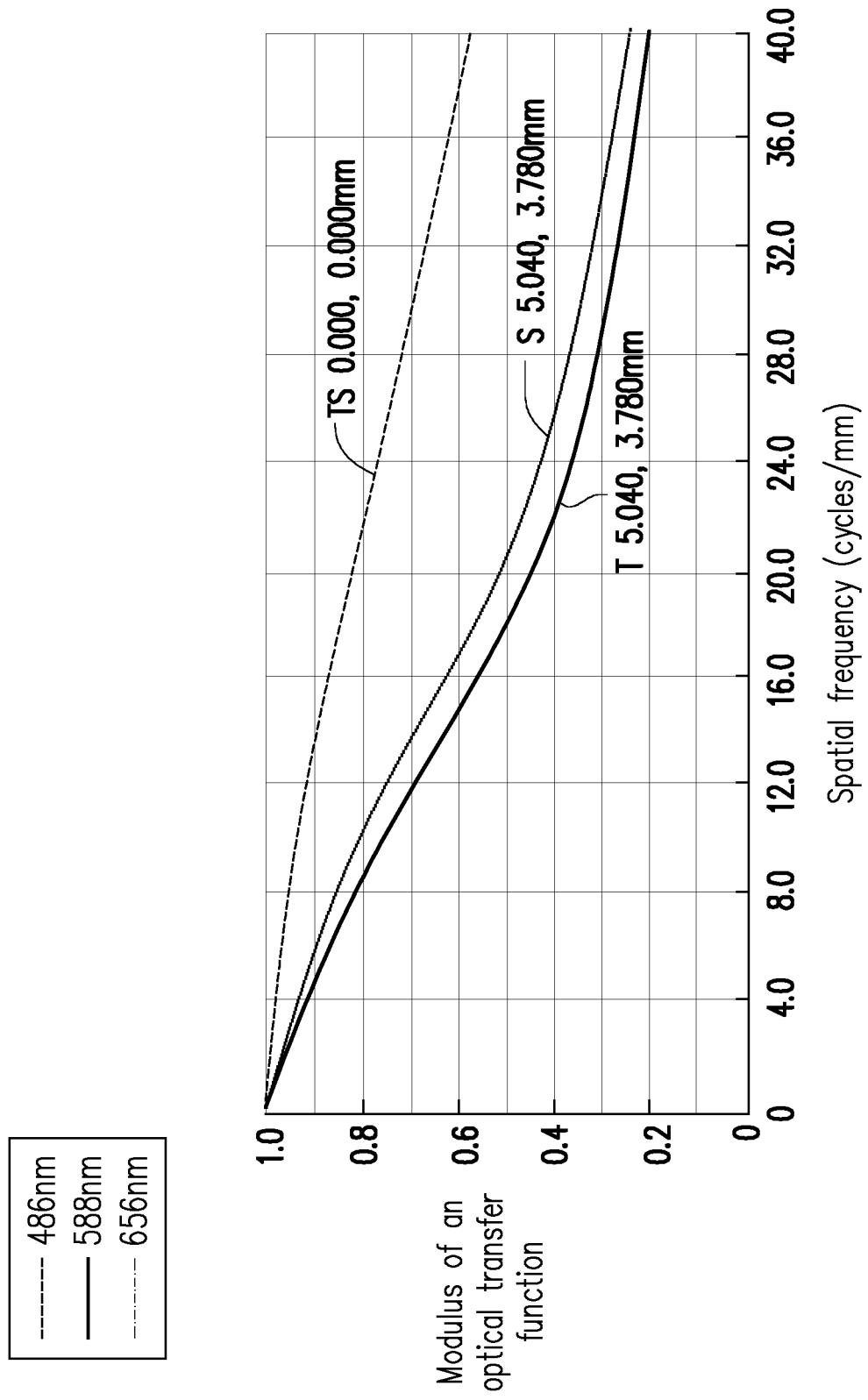
FIG. 3E is a modulation transfer function (MTF) diagram of the ocular optical system according to the first embodiment.

Specifically, FIG. 3A and FIG. 3B respectively illustrate field curvature aberration in a sagittal direction and field curvature aberration in a tangential direction of the present embodiment, FIG. 3C illustrates distortion aberration of the present embodiment, and FIG. 3D illustrates lateral color aberration of the present embodiment, where an airy disc in FIG. 3D is a position of the airy disc. In the two field curvature aberration diagrams of FIG. 3A and FIG. 3B, field curvature aberration of three representative wavelengths 486 nm, 588 nm, and 656 nm in an entire field of view fall within a range of ±0.3 mm, and this indicates that the ocular optical system 10 in the present embodiment can effectively eliminate aberration. The distortion aberration diagram of FIG. 3C shows that the distortion aberration of the present embodiment maintains within a range of ±0.4%, and this indicates that the distortion aberration of the present embodiment has satisfied an imaging quality requirement of the optical system. The lateral color aberration of FIG. 3D shows that the lateral color aberration of the present embodiment maintains within a range of ±10 μm. Accordingly, it indicates that compared with an existing ocular optical system, the present embodiment can still provide favorable imaging quality when the eye relief D is greater than approximately 30 mm. Therefore, the present embodiment can shorten the ocular optical system while maintaining favorable optical performance, thereby achieving a thin product design. In addition, the ocular optical system 10 of the present embodiment has a relatively large apparent field of view, and can correct aberration and maintain favorable imaging quality. In addition, a design of large eye relief D enables a sufficient space to exist between the pupil 0 of the eye and the first lens 1 to dispose the beam splitter 4, thereby achieving an augmented reality effect (as shown in FIG. 1).

Moreover, FIG. 3E is an MTF diagram of the ocular optical system according to the first embodiment, where a horizontal axis is in a unit of a spatial frequency in cycles per millimeter, a vertical axis is a modulus of an optical transfer function, T represents a curve in the tangential direction, S represents a curve in the sagittal direction, and values marked next to "TS", "T", and "S" represent image heights. As can be verified from this, a curve of the optical transfer function shown by the ocular optical system 10 in the present embodiment falls within a standard range, and therefore, the ocular optical system 10 has favorable optical imaging quality, as shown in FIG. 3E.

Figure 4:
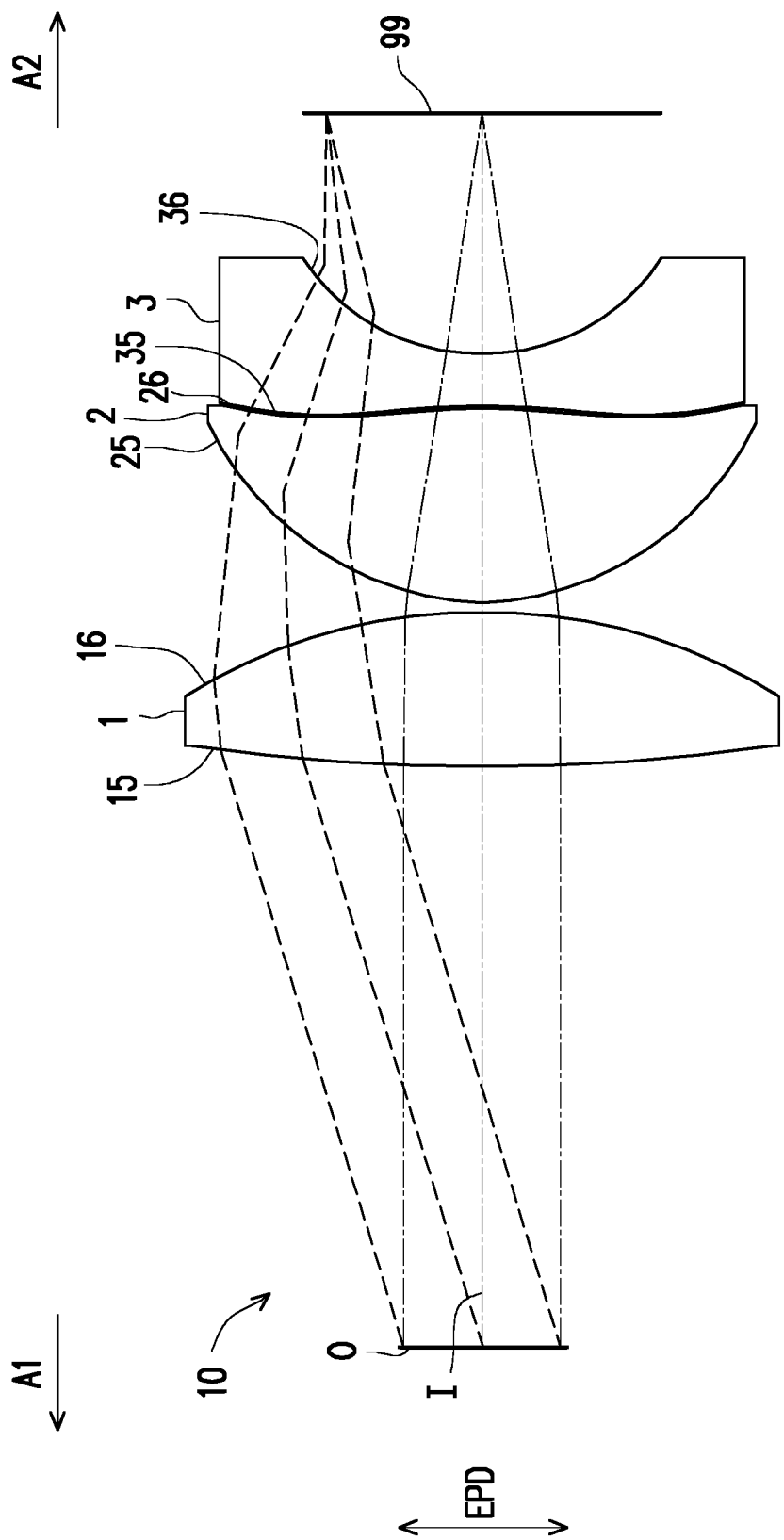
FIG. 4 is a schematic diagram of an ocular optical system according to a second embodiment of the invention.

FIG. 4 is a schematic diagram of the ocular optical system according to the second embodiment of the invention. FIG. 5A to FIG. 5D are diagrams of field curvature aberrations and various aberration of the ocular optical system according to the second embodiment. FIG. 5E is an MTF diagram of the ocular optical system according to the second embodiment. First referring to FIG. 4, FIG. 4 shows the second embodiment of the ocular optical system 10 in the invention, and it is briefly similar to the first embodiment in FIG. 2, and differences between the two are described as follows. The second embodiment in FIG. 4 and the first embodiment in FIG. 2 are more or less different in optical data, aspheric surface coefficients, and parameters of the first lens 1 to the third lens 3.

Detailed optical data of the ocular optical system 10 in FIG. 4 is shown in the following Table 4, and an EFL of the ocular optical system 10 in the invention is 26.740 mm, an apparent FOV is 37.93°, an EPD is 8 mm, and an Fno is 3.34.

The following Table 5 shows aspheric surface coefficients of the eye-side surfaces 15, 25, and 35 and the display-side surfaces 16, 26, and 36 of the first lens 1 to the third lens 3 in the present embodiment in the formula (1). In the present embodiment, $a_2$ is 0.

TABLE 5

| Surface | K | $\alpha_4$ | $\alpha_6$ | $\alpha_8$ |
|---|---|---|---|---|
| 15 | −1.220583992 | −1.726644E−06 | 3.800273E−08 | −1.237715E−10 |
| 16 | 0.627840875 | −1.983739E−05 | 1.121841E−07 | −1.967255E−10 |
| 25 | −0.288232781 | −3.003756E−06 | 3.992329E−08 | 1.955243E−11 |
| 26 | −21.03175513 | 6.015116E−05 | 8.842616E−08 | −6.927545E−10 |
| 35 | −21.03175513 | 6.015116E−05 | 8.842616E−08 | −6.927545E−10 |
| 36 | 0.532947661 | 1.362291E−04 | −6.728628E−07 | 1.171056E−08 |

In addition, relationships between important parameters in the ocular optical system 10 of the present embodiment are shown in the following Table 6.

TABLE 6

| Relational expression | Value |
|---|---|
| f/f1 + f/f2 + f/f3 | 0.25 |
| |f/f3| | 1.63 |
| CT3/CT2 | 0.28 |
| V3/(V2 − V3) | 0.67 |
| |R3 − R6|/|R3 + R6| | 0.01 |
| D/TTL | 0.89 |
| f/EPD | 3.34 |

Figures 5A, 5B, 5C:
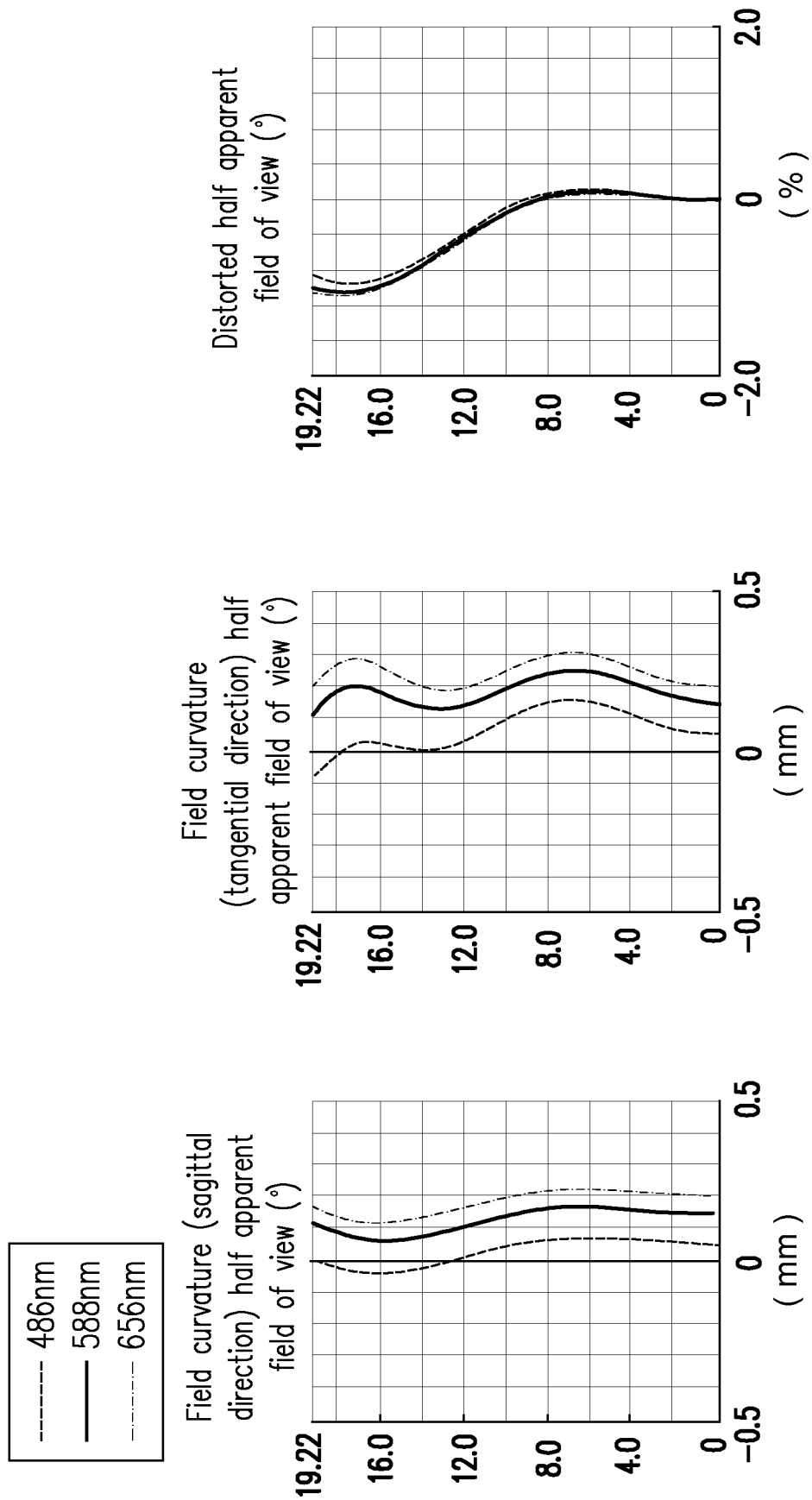
FIG. 5A to FIG. 5D are diagrams of field curvature aberrations and various aberrations of the ocular optical system according to the second embodiment.
Figure 5D:
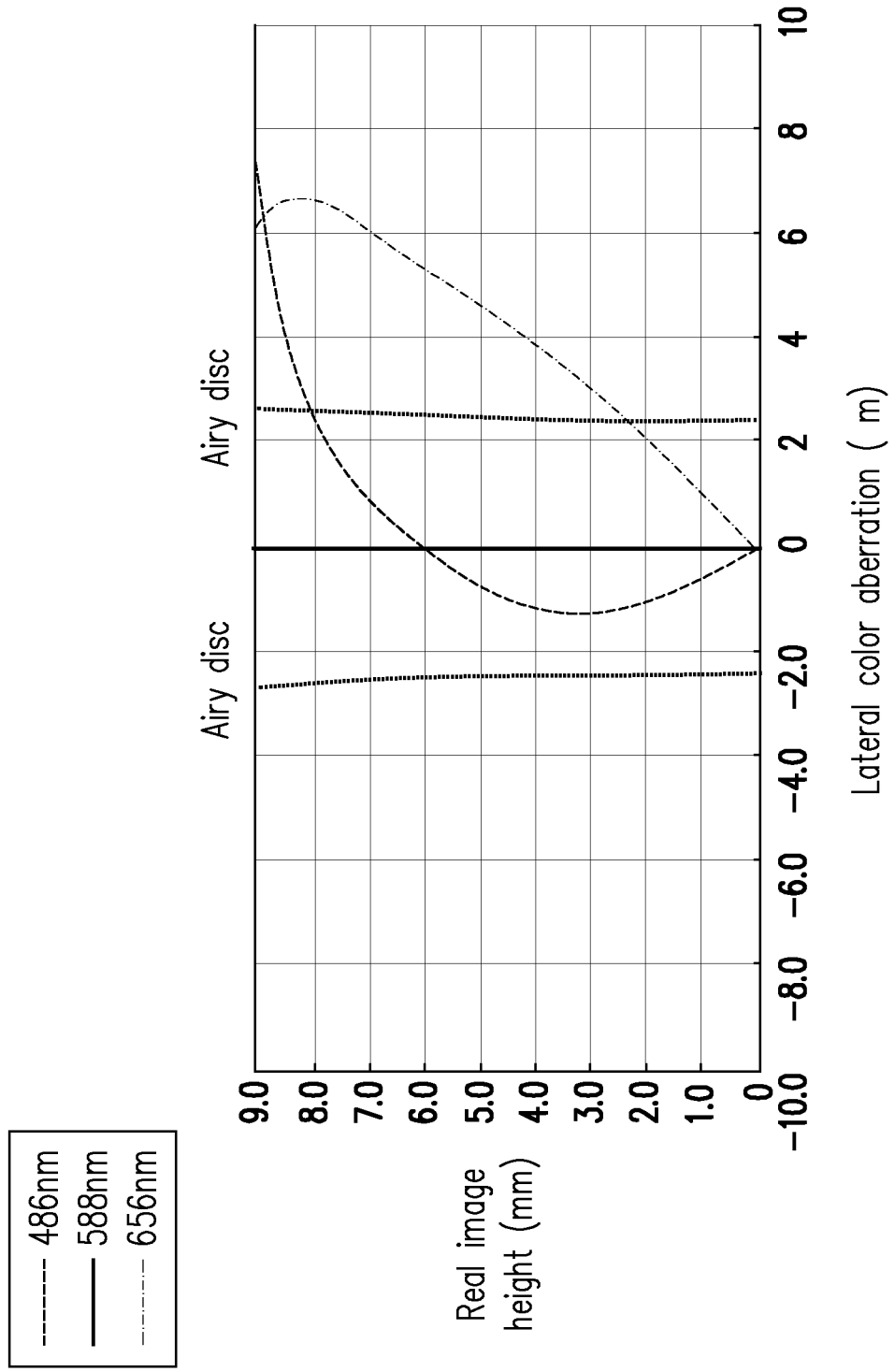
Figure 5E:
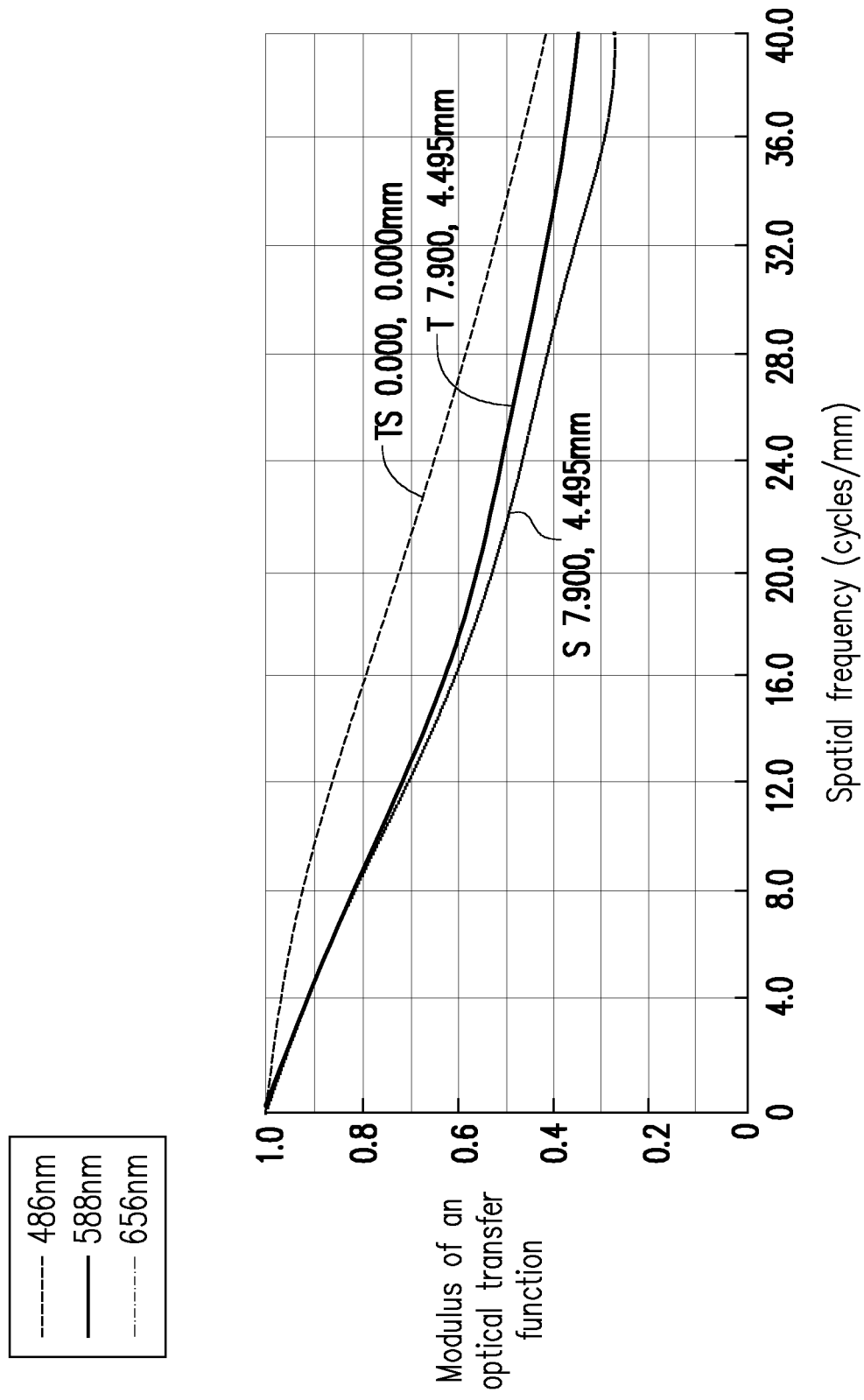
FIG. 5E is an MTF diagram of the ocular optical system according to the second embodiment.

The field curvature aberration in the sagittal direction and in the tangential direction of the present embodiment are shown in FIG. 5A and FIG. 5B. In the two field curvature aberration diagrams of FIG. 5A and FIG. 5B, field curvature aberration of three representative wavelengths in an entire field of view fall within a range of ±0.4 mm. The distortion aberration diagram of FIG. 5C shows that the distortion aberration of the present embodiment maintains within a range of ±1.2%. The lateral color aberration of FIG. 5D shows that the lateral color aberration of the present embodiment maintains within a range of ±8 μm. Accordingly, it indicates that the ocular optical system 10 in the present embodiment can still provide favorable imaging quality when the eye relief D is greater than approximately 30 mm.

Moreover, FIG. 5E is a modulation transfer function diagram of the ocular optical system according to the second embodiment. As can be verified from this, a curve of the optical transfer function shown by the ocular optical system 10 in the second embodiment falls within a standard range,

TABLE 4

The EFL = 26.740 mm, the FOV = 37.93°, the EPD = 8 mm, and the Fno = 3.34.

| Element | Surface | Curvature radius (mm) | Thickness (mm) | Refractivity | Abbe number | Focal length (mm) |
|---|---|---|---|---|---|---|
| Object | | Infinite | Infinite | | | |
| Pupil 0 | | Infinite | 30.006 | | | |
| First lens 1 | 15 | 107.166 | 8.003 | 1.544 | 55.662 | 45.215 |
| | 16 | −31.152 | 0.487 | | | |
| Second lens 2 | 25 | 13.893 | 10.012 | 1.544 | 55.662 | 20.734 |
| | 26 | −45.135 | 0.100 | | | |
| Third lens 3 | 35 | −45.135 | 2.840 | 1.642 | 22.409 | −16.366 |
| | 36 | 14.037 | 12.327 | | | |
| | 99 | Infinite | | | | | and therefore, the ocular optical system 10 has favorable optical imaging quality, as shown in FIG. 5E.

It can be learned from the foregoing descriptions that, compared with the first embodiment in FIG. 2, the second embodiment in FIG. 4 has the following advantage: the lateral color aberration of the second embodiment in FIG. 4 is less than the lateral color aberration of the first embodiment in FIG. 2.

When the relational expression of the optical parameters in the ocular optical system 10 in the embodiments of the invention satisfies the following conditions or at least one of the following designs, it may assist a designer in designing a technically feasible ocular optical system with favorable optical performance and an effectively reduced overall length:

1. When the ocular optical system 10 satisfies a condition: $0<f/f1+f/f2+f/f3<0.35$, refraction distribution of the ocular optical system 10 may be effectively balanced, so that the positive refractive power of the first lens 1 and the positive refractive power of the second lens 2 match the negative refractive power of the third lens 3, thereby reducing sensitivity of the ocular optical system 10, and helping improve stability of the ocular optical system 10 during assembly and testing.

2. When the ocular optical system 10 satisfies a condition: $|f/f3|>1.6$, it helps inhibit system distortion of the ocular optical system 10 and improve imaging quality of the ocular optical system 10.

3. When the ocular optical system 10 satisfies a condition: $0.25<CT3/CT2<0.8$, preferably, $0.25<CT3/CT2<0.4$, a total optical length of the ocular optical system 10 may be effectively reduced by appropriately adjusting the thicknesses CT2 and CT3 of the second lens 2 and the third lens 3.

4. When the ocular optical system 10 satisfies a condition: $V3/(V2-V3)<0.8$, color aberration of the ocular optical system 10 may be effectively corrected.

5. When the ocular optical system 10 satisfies a condition: $|R3-R6|/|R3+R6|<0.12$, astigmatism of the ocular optical system 10 may be effectively corrected and favorable telecentricity may be provided for the display side of the ocular optical system 10, thereby preventing display brightness from changing with a visual angle.

6. When the ocular optical system 10 satisfies a condition: $D/TTL>0.85$, the ocular optical system 10 may maintain miniaturized, suitable for being equipped on an augmented reality or a see-through near-eye display device.

7. When the ocular optical system 10 satisfies a condition: $f/EPD<3.35$, it helps improve a resolution capability of the ocular optical system 10 and prevent vignetting.

Based on the above, the field curvature aberration, the distortion aberration, and the lateral color aberration in the embodiments of the invention all comply with usage specifications. In addition, off-axis light beams of the three representative wavelengths 656 nm (red light), 588 nm (green light), 486 nm (blue light) at different heights are concentrated near imaging points, and it may be learned from an inclination of each curve that, deviations of the imaging points of the off-axis light beams at the different heights are all controlled, thereby achieving a favorable capability of inhibiting a ball difference, an image difference, distortion, and color aberration. Further referring to imaging quality data, the three representative wavelengths 656 nm, 588 nm, and 486 nm are also quite close to one another, showing that light beams of different wavelengths are well concentrated in various states in the embodiments of the invention, thereby achieving a favorable aberration inhibition capability. Therefore, it can be learned from the foregoing descriptions that the embodiments of the invention have favorable optical performance. Therefore, the ocular optical system in the embodiments of the invention exhibits features of lightness, long eye relief, and favorable telecentricity and delivers favorable optical imaging quality.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An ocular optical system, configured to allow an imaging ray to enter an eye of an observer from a display image through the ocular optical system to form an image, wherein a direction toward the eye is an eye side, a direction toward the display image is a display side, the ocular optical system sequentially comprises a first lens, a second lens, and a third lens along an optical axis from the eye side to the display side, the first lens to the third lens each comprises an eye-side surface facing the eye side and allowing the imaging ray to pass and a display-side surface facing the display side and allowing the imaging ray to pass;

the first lens having positive refractive power;
the second lens having positive refractive power;
the third lens having negative refractive power; and
the ocular optical system satisfying:

$$0<f/f1+f/f2+f/f3<0.35; \text{ and}$$

$$D>30 \text{ mm},$$

wherein f is a system focal length of the ocular optical system, f1 is a focal length of the first lens, f2 is a focal length of the second lens, f3 is a focal length of the third lens, and D is a distance from a pupil of the observer to the eye-side surface of the first lens on the optical axis.

2. The ocular optical system according to claim 1, wherein the ocular optical system further satisfies: $|f/f3|>1.6$.

3. The ocular optical system according to claim 1, wherein the ocular optical system further satisfies: $0.25<CT3/CT2<0.8$, wherein CT2 is a thickness of the second lens on the optical axis, and CT3 is a thickness of the third lens on the optical axis.

4. The ocular optical system according to claim 1, wherein the ocular optical system further satisfies: $V3/(V2-V3)<0.8$, wherein V2 is an Abbe number of the second lens, and V3 is an Abbe number of the third lens.

5. The ocular optical system according to claim 1, wherein the ocular optical system further satisfies: $|R3-R6|/|R3+R6|<0.12$, wherein R3 is a curvature radius of the eye-side surface of the second lens, and R6 is a curvature radius of the display-side surface of the third lens.

6. The ocular optical system according to claim 1, wherein the ocular optical system further satisfies: $D/TTL>0.85$, wherein TTL is a distance from the eye-side surface of the first lens to the display image on the optical axis.

7. The ocular optical system according to claim 1, wherein the ocular optical system further satisfies: $f/EPD<3.35$, wherein EPD is an exit pupil diameter of the ocular optical system.

8. The ocular optical system according to claim 1, wherein only the first lens, the second lens, and the third lens in the ocular optical system have refractive power.

9. The ocular optical system according to claim 1, further comprising a beam splitter, disposed between the eye of the observer and the first lens on the optical axis, wherein the optical axis comprises a first optical axis and a second optical axis not overlapping the first optical axis, and the first optical axis and the second optical axis intersect at an intersection point on a beam splitting surface of the beam splitter, wherein a lens having refractive power in the ocular optical system is disposed only on the second optical axis.

* * * * *